United States Patent [19]
Leuthold et al.

[11] Patent Number: 6,065,877
[45] Date of Patent: May 23, 2000

[54] THERMAL COMPENSATION FOR FLUID DYNAMIC BEARING USING BIMETAL PARTS

[75] Inventors: Hans Leuthold, Santa Cruz; Alan Lyndon Grantz, Aptos; Matt L. Shumway, San Jose; Norbert S. Parsoneault, Scotts Valley; Etoli Wolff, Sunnyvale; Michael D. Kennedy, Boulder Creek; Samnathan Murthy, Santa Cruz; Raquib U. Khan, Pleasanton; Mohamed M. Rahman, San Jose; Wesley R. Clark, Watsonville, all of Calif.

[73] Assignee: Seagate Technology, Inc., Scotts Valley, Calif.

[21] Appl. No.: 09/178,528

[22] Filed: Oct. 23, 1998

[51] Int. Cl.[7] .............................. F16C 32/06; F16C 17/22
[52] U.S. Cl. .......................... 384/278; 384/110; 384/905
[58] Field of Search .................................. 384/100, 107, 384/110, 114, 278, 905

[56] References Cited

U.S. PATENT DOCUMENTS

| | | | |
|---|---|---|---|
| 5,524,985 | 6/1996 | Dunfield | 384/107 |
| 5,628,569 | 5/1997 | Hayakawa et al. | 384/278 |
| 5,664,889 | 9/1997 | Gustafson | 384/278 X |

*Primary Examiner*—Thomas R. Hannon
*Attorney, Agent, or Firm*—Flehr Hohbach Test Albritton & Herbert L.L.P.

[57] ABSTRACT

A bimetallic part is formed from metals or comprises metals with different thermal expansion coefficients. A first element defines the part and defines one surface of the bearing gap and has a first coefficient of expansion and a second element is wholly or partially inserted into and constrained within the first element and having a different coefficient of thermal expansion so that as the temperature changes, the stress created by the differential expansion of the two elements will cause the overall part to deform elastically as a function of temperature. This deformation will cause the gap, the elements being properly selected, to narrow as temperature rises (and viscosity falls) and to widen as temperature falls (and viscosity rises).

17 Claims, 9 Drawing Sheets

THERMAL COMPENSATION FOR FLUID DYNAMIC BEARING USING BIMETAL PARTS

FIELD OF THE INVENTION

The present invention is directed to fluid dynamic bearings. More particularly, the present invention pertains to a fluid dynamic bearing with a low stiffness and/or drag change over temperature, allowing the fluid dynamic bearing to be used for applications which require a relatively constant stiffness and/or drag, and where the temperature varies over a significant range.

BACKGROUND OF THE INVENTION

Disc drives are commonly used in workstations, personal computers, laptops and other computer systems to store large amounts of data in a form that can be made readily available to the user. In general, a disc drive comprises a magnetic disc that is rotated by a spindle motor. The surface of the disc is divided into a series of data tracks. The data tracks are spaced radially from one another across a band having an inner diameter and an outer diameter. Each of the data tracks extends generally circumferentially around the disc and can store data in the form of magnetic transitions within the radial extent of the track on the disc surface. Typically, each data track is divided into a number of data sectors that store fixed sized data blocks.

A head includes an interactive element, such as a magnetic transducer, that is used to sense the magnetic transitions to read data, or to transmit an electrical signal that causes a magnetic transition on the disc surface, to write data. The magnetic transducer includes a read/write gap that positions the active elements of the transducer at a position suitable for interaction with the magnetic transitions on the surface of the disc, as the disc rotates.

As known in the art, the magnetic transducer is mounted by the head to a rotary actuator arm and is selectively positioned by the actuator arm over a preselected data track of the disc to either read data from or write data to the preselected data track, as the disc rotates below the transducer. The head structure includes a slider having an air bearing surface that causes the transducer to fly above the data tracks of the disc surface due to fluid currents caused by rotation of the disc.

One part of the motors used in disc drives is the bearing. The basic fluid dynamic bearing involves parts which must move relative to one another, such as a shaft and a sleeve or a thrust plate and a housing, separated by a small gap filled with a viscous fluid such as oil. One characteristic of fluid dynamic bearings is stiffness, which is a measure of the amount of displacement per unit force applied to the rotating element. The force could be due to gravity, an imbalance in the rotating element, or some other source. Another characteristic of fluid dynamic bearings is drag, which refers to the torque required to rotate the rotating element at a rated speed.

One problem with the fluid dynamic bearing is that the stiffness of the bearing is very sensitive to changes in temperature. This is because the stiffness depends on the viscosity of the bearing fluid, and the viscosity of the bearing fluid typically changes with temperature. The bearing drag is proportional to viscosity, and also varies significantly with temperature. In certain applications, such as the use of the fluid dynamic bearing in a disc drive motor, the bearing must operate over a wide range of temperature. As a result, a fluid dynamic bearing with adequate stiffness at one temperature will have a stiffness which is too high at lower temperatures, and too low at higher temperatures, making the fluid dynamic bearing unsuitable for such an application. The same problem occurs with respect to drag.

Prior art fluid dynamic bearings have the problem that stiffness and/or drag are highly dependent on temperature, making conventional fluid dynamic bearings difficult to use for certain applications, such as use in disc drives, VCR helical scanners, gyros, and other rotating devices. There is a need for a fluid dynamic bearing with a reduced dependence of stiffness and/or drag on temperature.

Several prior attempts to solve the problem of temperature dependence of stiffness and/or drag in a fluid dynamic bearing make the different parts of the bearing from materials with different coefficients of thermal expansion. See e.g. Gustafson U.S. Pat. No. 5,664,889. The materials from which the bearing is made can be chosen such that the fluid gap decreases as the temperature increases. A bearing with a small gap has a higher stiffness and/or drag due to the change in the viscosity of the fluid with temperature.

SUMMARY OF THE INVENTION

The present invention solves the problem of temperature dependence of stiffness and/or drag in a fluid dynamic bearing by forming a single part which incorporates or directly supports one of the two first facing surfaces of the fluid dynamic bearing gap as a bimetallic part. The bimetallic part is formed from metals or comprises metals with different thermal expansion coefficients. A first element defines the part and defines one surface of the bearing gap and has a first coefficient of expansion and a second element is wholly or partially inserted into and constrained within the first element and having a different coefficient of thermal expansion so that as the temperature changes, the stress created by the differential expansion of the two elements will cause the overall part to deform elastically as a function of temperature. This deformation will cause the gap, the elements being properly selected, to narrow as temperature rises (and viscosity falls) and to widen as temperature falls (and viscosity rises).

Careful choice of bearing materials can decrease or even reverse the temperature dependence of stiffness and/or drag. This reduction in temperature dependence of stiffness and drag allows fluid dynamic bearings to be used for applications for which they were not as well suited before the present invention, such as use in disc drives, VCR helical scanners, gyros, and other rotating devices.

Other features and advantages of the invention can be learned from a review of the following exemplary embodiments given with respect to the figures listed below.

BRIEF DESCRIPTION OF THE DRAWINGS

Other features and advantages of the present invention will become apparent to a person of skill in the art who studies the following invention disclosure which is given with respect to the following figures.

DETAILED DESCRIPTION OF THE PREFERRED EMBODIMENTS

Figure 1:
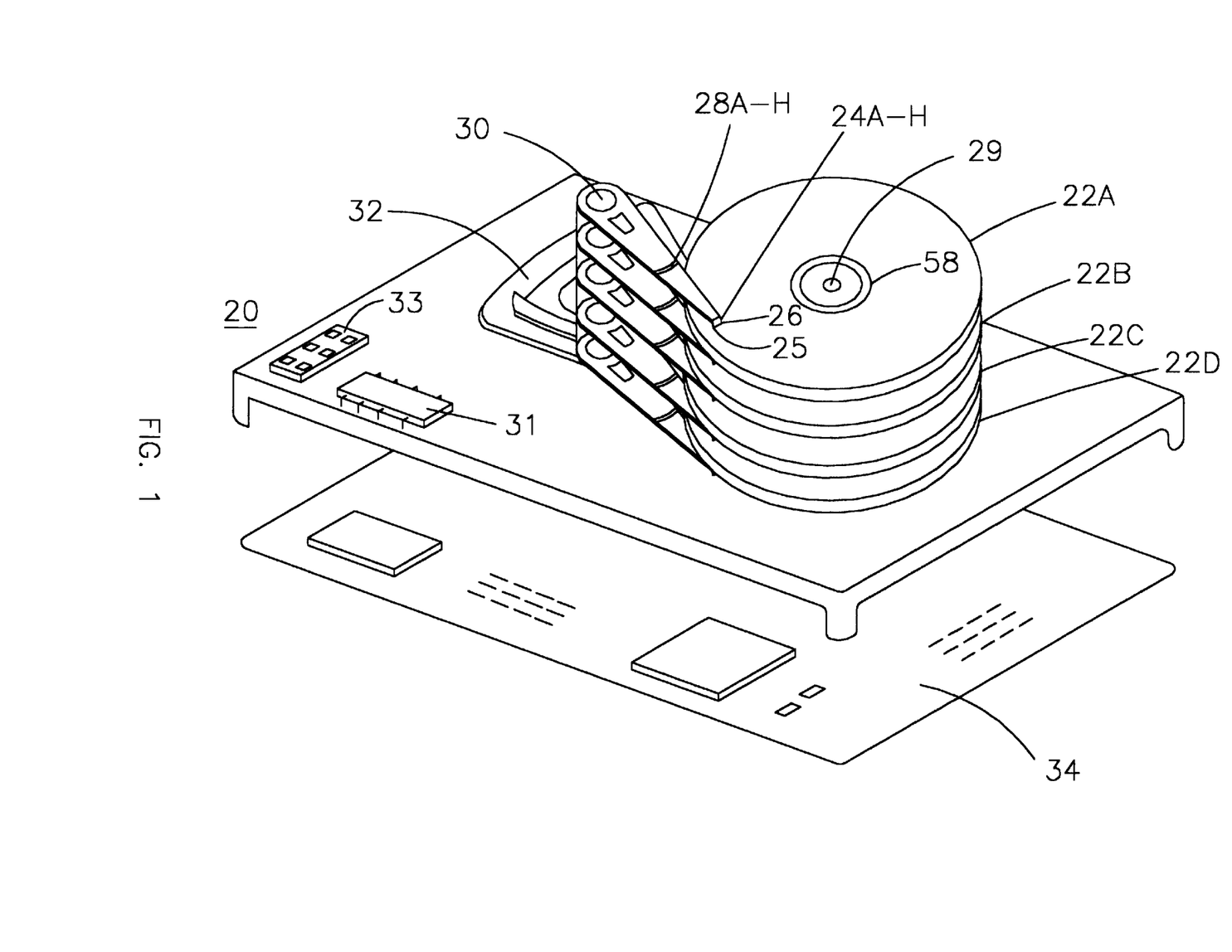
FIG. 1 is a perspective view of a disc drive in which the present invention is useful.

Referring to FIG. 1, there is illustrated an example of a disc drive designated generally by reference number 20. Disc drive 20 includes a stack of storage discs 22a–d and a stack of read/write heads 24a–h. Each storage disc 22a–d is provided with a plurality of data tracks to store user data. As illustrated in FIG. 1, one head 24a–h is provided for each surface of each disc 22a–d such that data can be read from or written to data tracks on both sides of each storage disc 22. It should be understood that disc drive 20 is merely representative of a disc drive system utilizing the present invention and that the present invention can be implemented in a disc drive system including more or less storage discs 22, or in disc drives of a different design, or in systems other than disc drives.

Heads 24 are coupled to a pre-amplifier 31. During a read operation, electrical signals transduced by the transducer from the magnetic transitions on the disc surface are processed by pre-amplifier 31 and transmitted to read/write channel circuitry in the disc drive for eventual transmission to a host computer using the disc drive to store data. During a write operation, electrical signals representative of data are received by the read/write channel from the host computer for transmission to pre-amplifier 31. Pre-amplifier 31 includes a write driver electrically coupled to the head transducer to transmit the signals corresponding to the data to the head. The head is responsive to the signals received from the write driver to conduct an electrical signal and thereby cause magnetic transitions on the disc surface that correspond to the data.

Storage discs 22a–d are mounted for rotation by a spindle motor arrangement 29. An actuator assembly 30 supports read/write heads 24a–h. Each head 24a–h is mounted on an actuator arm 28a–h for controlled positioning over preselected radii of storage discs 22a–d to enable the reading and writing of data from and to selected data tracks. To that end, actuator assembly 30 is rotatably mounted on board 21, and a voice coil motor 32 controllably rotates actuator arms 28a–h radially across the disc surfaces.

Each read/write head 24a–h is mounted to a respective actuator arm 28a–h by a flexure element (not shown) and comprises a magnetic transducer 25 mounted to a slider 26 having an air bearing surface (not shown), all in a known manner. As typically utilized in disc drive systems, sliders 26 cause magnetic transducers 25 of read/write heads 24a–h to "fly" above the surfaces of the respective storage discs 22a–d for non-contact operation of the disc drive system, as discussed above. When not in use, voice coil motor 32 rotates actuator arms 28a–h during a contact stop operation, to position read/write heads 24a–h over a respective landing zone 58 or 60 (see FIG. 2), where read/write heads 24a–h come to rest on the storage disc surfaces. As should be understood, each read/write head 24a–h is at rest on a respective landing zone 58 or 60 at the commencement of a contact start operation. A printed circuit board (PCB) 34 is provided to mount control electronics for controlled operation of spindle motor 29 and voice coil motor 32. PCB 34 also includes read/write channel circuitry coupled to read/write heads 24a–h via pre-amplifier 31, to control the transfer of data to and from the data tracks of storage discs 22a–d. The manner for coupling PCB 34 to the various components of the disc drive is well known in the art, and includes a connector 33 to couple the read/write channel circuitry to pre-amplifier 31.

Figure 2:
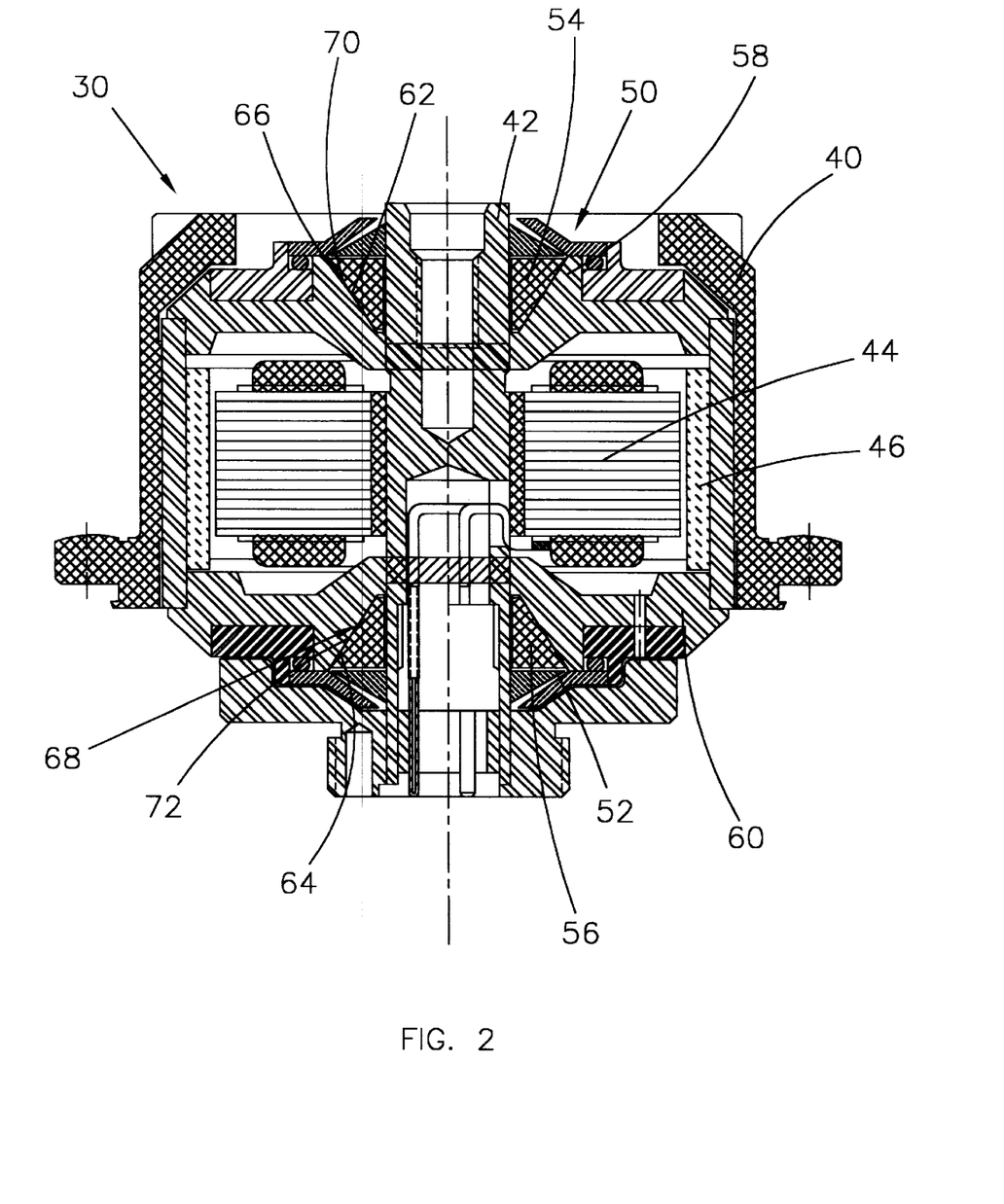
FIG. 2 is a vertical sectional view of a motor useful in the disc drive of FIG. 1 and in which the present invention may be used.

FIG. 2 shows an exemplary motor 30 of the type used to support discs 22 for constant speed rotation in detail. The temperature compensation scheme of the present invention can be incorporated in this motor design and is shown herein as an example.

However, it must be understood that this present invention is not limited to use in this particular type of motor, or indeed in the particular bearing seat of this exemplary motor. In fact, the principles and concepts of this invention can be incorporated in other parts, and in other motors, or in sections of a fluid dynamic bearing design which may not necessarily be included in a motor. For example, a discrete fluid dynamic bearing described in detail in U.S. application Ser. No. 60/086,364, filed May 19, 1998, by Grantz et al. could readily benefit from the application of the principles of the present design; that application is incorporated herein by reference.

In this particular motor, rotation is imparted to the hub 40 relative to the shaft 42 by a set of coils 44 which interact with a magnet 46 in a well-known manner. A pair of fluid dynamic bearings generally indicated at 50, 52 and located at either end of the shaft 42 support the hub 40 for rotation about the shaft 42. Each of the fluid dynamic bearings 50, 52 comprise a cone 54, 56 mounted on the shaft 42 and facing a surface of a bearing seat 58, 60 which support the magnet and hub for rotation about the shaft. The bearing cones each have a generally conical or spherical or lenticular or similar surface 62, 64 facing a surface 66, 68 across the bearing gap 70, 72. Further details of the structure and theory of operation of this fluid dynamic bearing can be found in the above-incorporated application. The effectiveness of this invention is not limited to use with a particular surface.

For lubrication purposes, oil or similar fluid is found or present in each of the bearing gaps 70, 72. As discussed above, the problem with the use of a fluid dynamic bearing lies in the fact that the bearing gap is typically very thin, on the order of 4–6 $\mu$m; and with such small dimensions, the stiffness of the bearing is very sensitive to changes in temperature because the viscosity of the bearing fluid will typically change with temperature. The operating temperature of a typical motor for example may range from 5–90° C. To account for these changes in viscosity, it is most desirable to cause the gap to decrease as temperature goes up above some median level, and to increase at lower temperatures.

Figure 3:
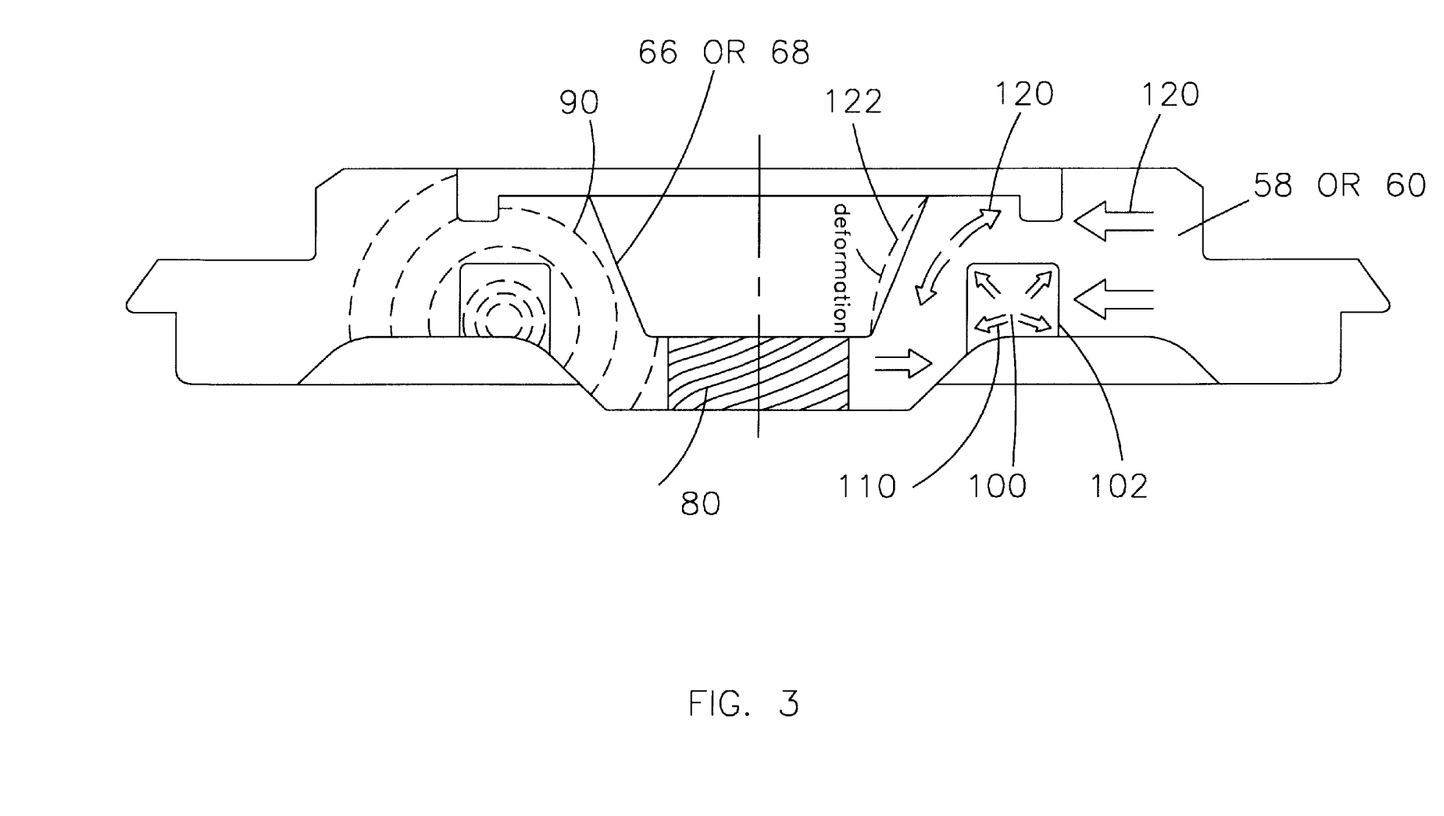
FIG. 3 is a sectional view of a bearing seat incorporating an insert to form a bimetal thermal compensation system in accordance with this invention.
Figure 4A:
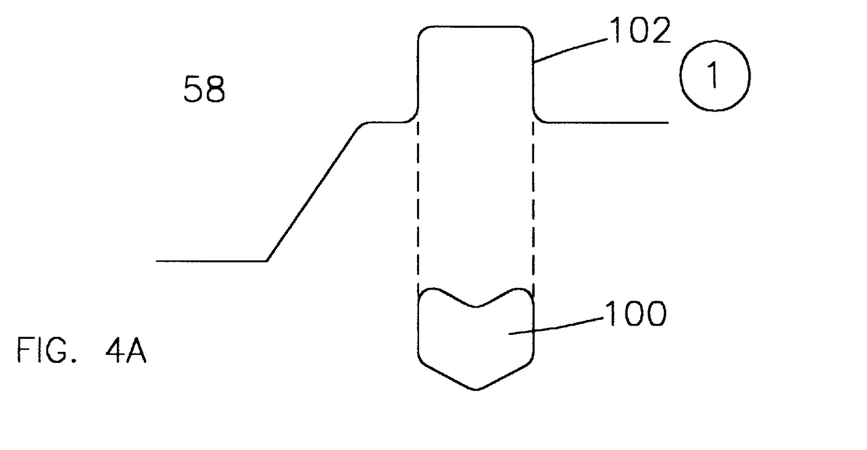
FIGS. 4A, 4B, and 4C are a sequence of views showing the installation of the expansion insert in the bearing seat of FIG. 3.
Figure 4B:
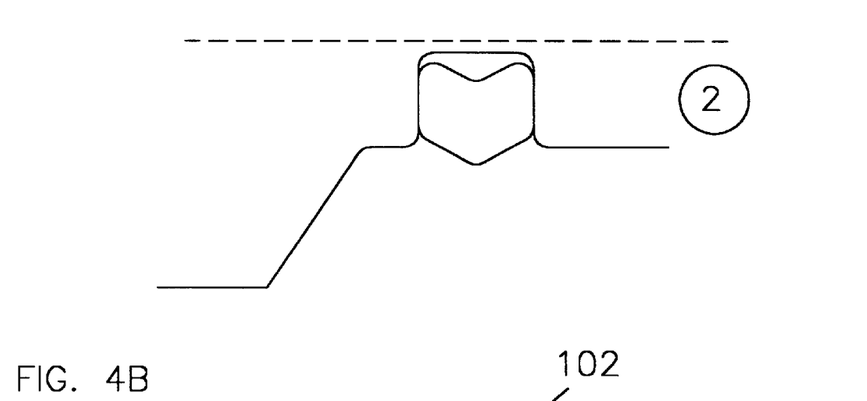
Figure 4C:
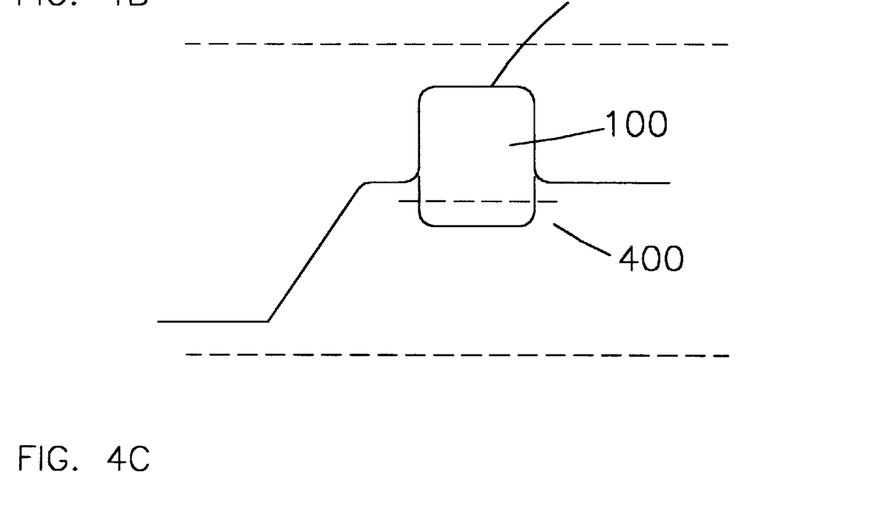
Figure 6:
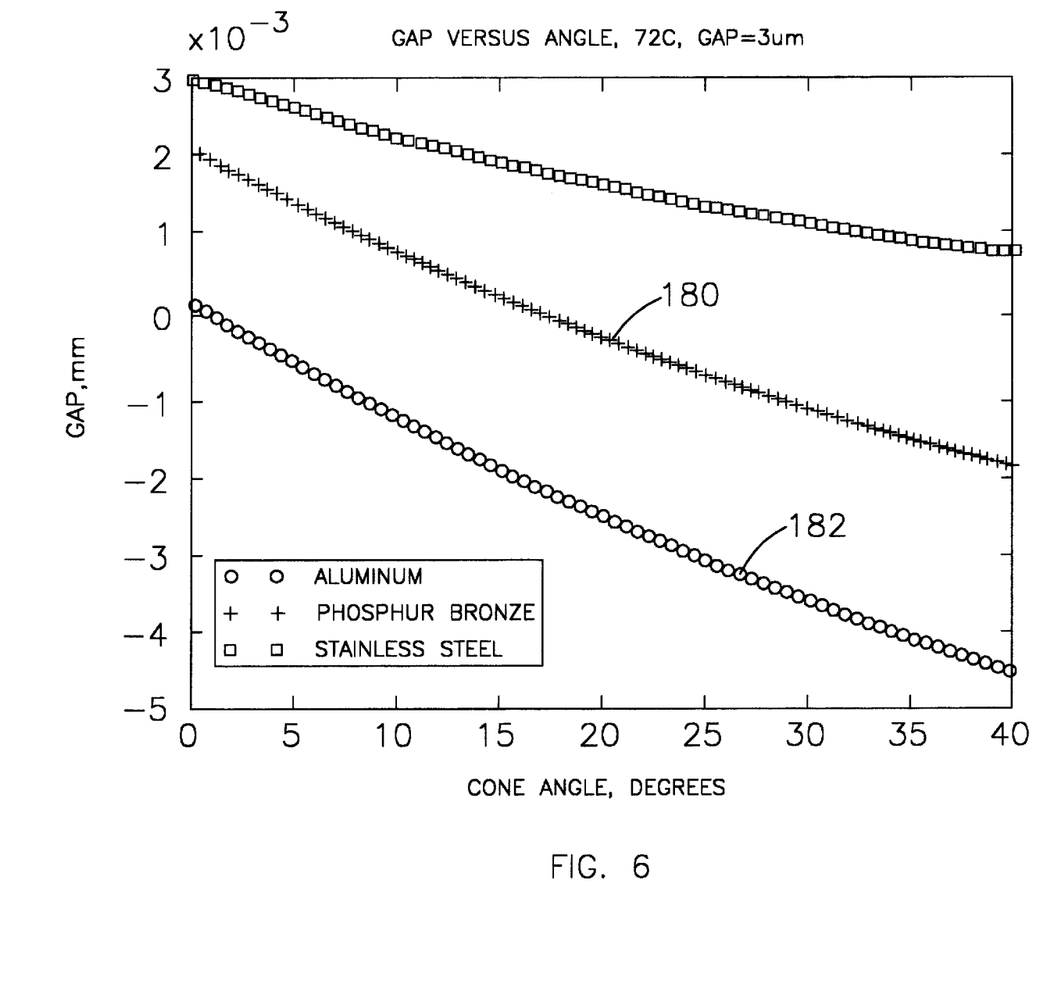
FIG. 6 is a graph showing the expansion characteristic of different metals and their effect on the fluid dynamic bearing gap.
Figure 7:
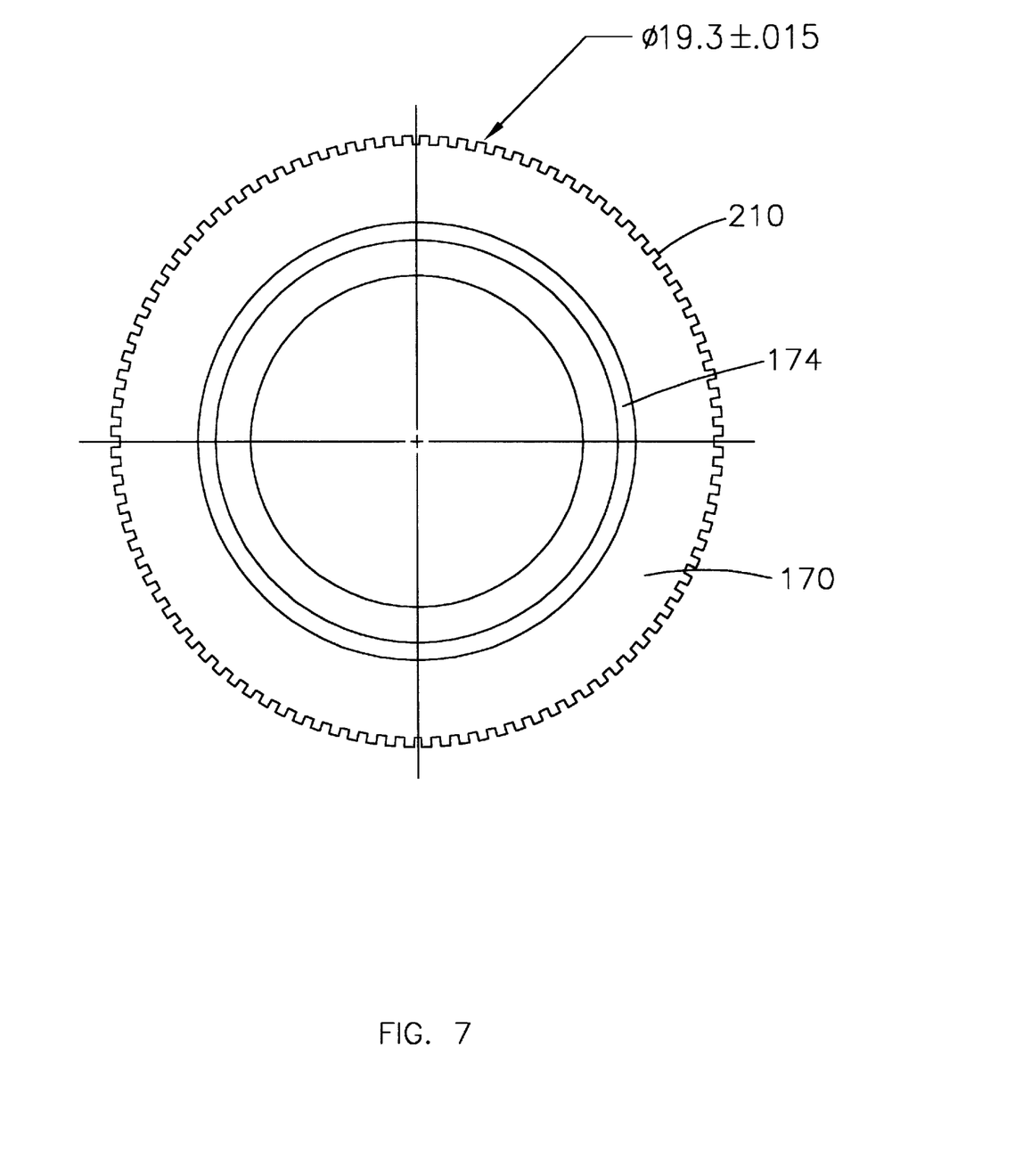
FIG. 7 is a top plan view of the insert shown in FIG. 5.

It is therefore desirable to develop a design in which one of the two faces defining the bearing gap moves or is deformed to be closer to the other face and reduce the bearing gap as temperature goes up from some nominal level; and, it is also desirable to have that same face move slightly further away as the temperature is reduced so that as viscosity of the fluid in the gap increases, the combination of the gap which is now slightly wider and the viscosity which is higher, maintains substantially the same level of stiffness. The basic principles of the modified bimetallic part of the present invention can be seen in FIG. 3 which shows a bearing seat of the same design as the bearing seat 58, or 60, of FIG. 2. However, in FIG. 4 in this modified bearing seat, the seat includes a central portion 80 which surrounds the shaft 42 so that the bearing seat may be formed of a single, integral piece. The bearing seat further includes a fairly thin angular section 90 which defines one face 66, or 68 of the fluid dynamic bearing. Adjacent this section is the bimetallic element 100. In this particular embodiment, the major part of the bearing seat 58, 60 is formed of steel and the bimetallic element comprises aluminum. The pieces are chosen so that the element 100 has a greater coefficient of expansion than the bearing seat 58, 60 which is the first or basic element of the bimetallic part. The result is that as temperature rises, the bimetallic element 100 which is fitted tightly into a recess in the bearing seat 60 attempts to expand as indicated by the arrows 110. Since the bearing seat 60 does not expand nearly as quickly, the stresses that are produced by this lower rate of expansion are indicated by the arrows 120. It can be seen that because the recess 102 for the bimetallic element 100 is relatively close to the bearing face 66, 68, the result of the expansion of element 100 will be the deformation by movement of the bearing face indicated by the dashed line 122. Thus as the temperature rises, the bearing gap will be reduced by movement of one bearing face closer to the other; since the viscosity of the fluid is falling, the bearing stiffness is maintained. For example, as shown in FIG. 6, for an element made of phosphor-bronze 180, as shown in FIG. 6, a substantially greater change in the fluid bearing gap can be achieved than with an insert made of stainless steel. In a further alternative, where the insert is made of aluminum, then the change in gap as represented by the line 182 will be substantially greater than that for phosphor-bronze or for stainless steel.

The assembly of this part would be relatively simple. After the bearing seat 58 is fabricated including recess or gap 102, then the expansion element or insert 100 which is in a shape of a shallow V and has a radial or lateral extent which is substantially the same as the radial extent of the gap 102 is inserted. As can be seen from an inspection of FIGS. 4A, 4B, and 4C, after the element 100 is aligned with opening 102, it is pressed into place still in its shallow V shape. Then a ran punch or equivalent is used to jam the element 100 tightly into the opening 102. Thereafter, as a final step the excess material is eliminated roughly along the line 400 so that a flat surface is presented.

Figure 5:
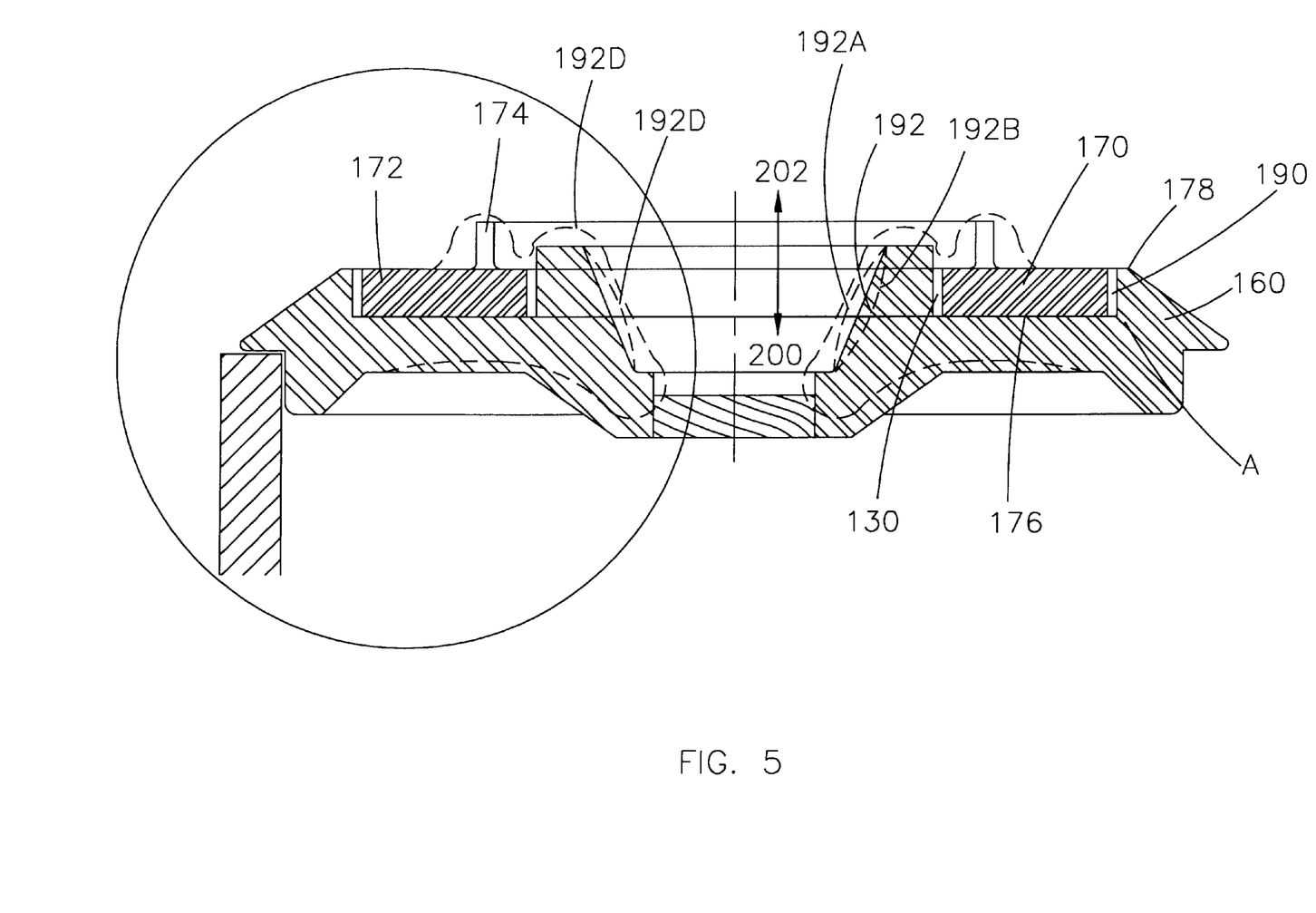
FIG. 5 is a sectional view of a bearing seat of a type used in the motor of FIG. 2 and incorporating the present invention.

A more sophisticated design is shown in the cross section of FIG. 5. In FIG. 5, the bearing seat 160 is of substantially the same design, but the expansion element 170 has been designed to cooperate with the bearing seat 160 to form a bimetallic bending disc structure. As with the previous embodiment, the compensation element 170 fits tightly into a recess 176 which is preferably in the top surface 178 of the bearing seat 160. The material of the insert generally indicated at 130 is chosen to have a coefficient of expansion substantially different from, and preferably greater than, the coefficient of expansion of the bearing seat 160 which is typically made of stainless steel.

In both instances described above, the change in gap angle is achieved by the fact that as the insert 170 expands (or contracts) more rapidly than the bearing seat 160 which surrounds and contacts it on three sides, the insert will tend to push against the radially outer edge 190 of the recess 176, causing an outward bowing of the entire seat so that the surface effectively appears as the dashed line 192d. When the insert 170 expands, it causes the bearing seat structure to bow outward (or axially, if pictured as used in FIG. 2), causing the outward movement of surface 192. This closes the gap between the bearing surfaces. Conversely, with contraction of the insert, bending in the opposite direction in the direction of the arrow 200 will occur.

As shown in FIG. 5, the bearing seat effectively hinges about point A, forming a simple, axially bowed or arc-like shape. Firm, surface-to-surface contact between the insert and the seat is sufficient at surfaces 176, 190 to create the axial bowing effect with changes in temperature either above or below some median temperature where no bowing occurs. This median temperature is typically about 25° C., the temperature at which the bearing is assembled.

Figure 8:
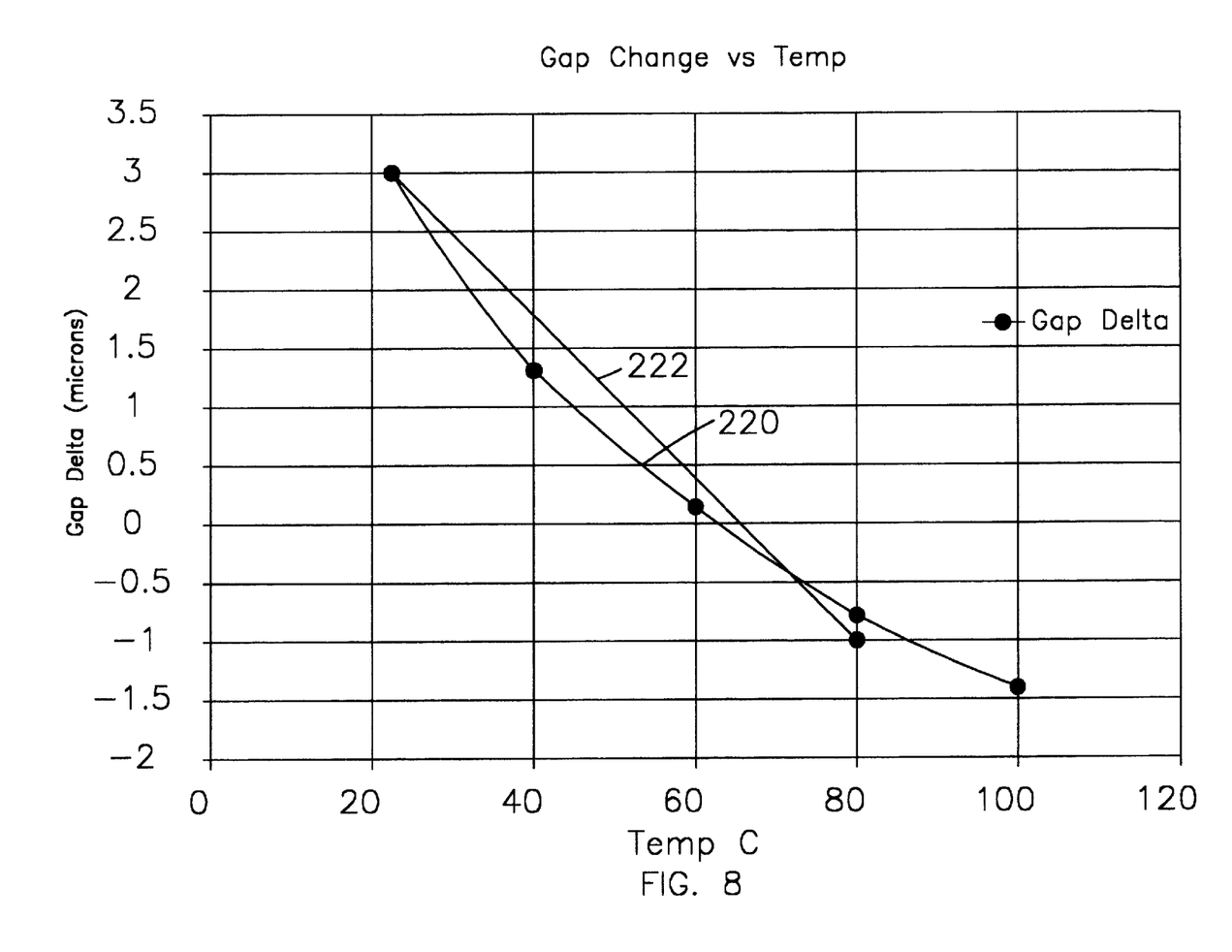
FIG. 8 is a graph of gap change with temperature for an insert of the type shown in FIG. 5.
Figure 9:
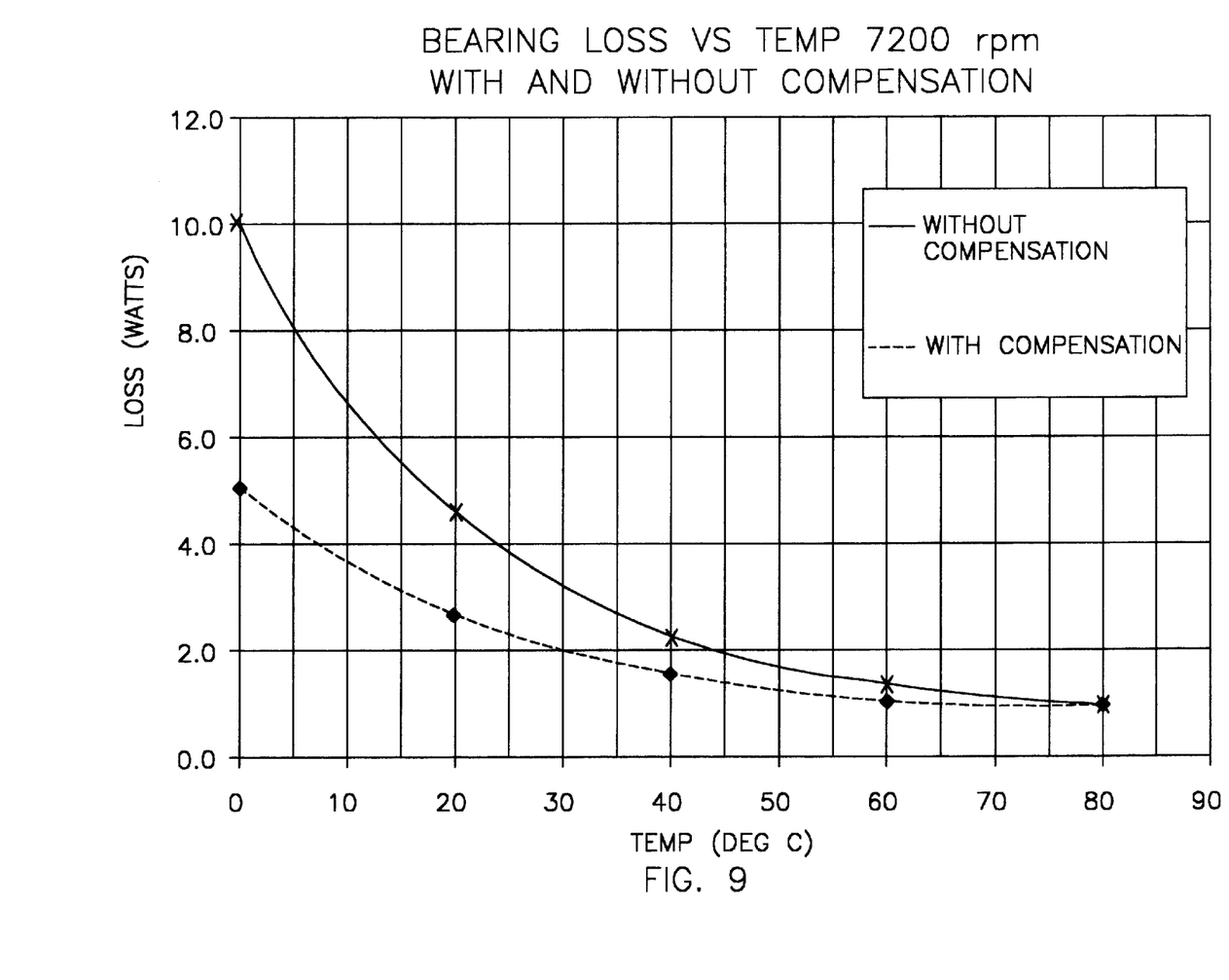
FIG. 9 is a graph of bearing power loss versus gap with and without compensation.

It can also be seen that a tight fit of the insert 170 into the recess 178 is essential. Therefore, it is preferable to provide a knurled, serrated or otherwise textured or grooved outer surface 210 on the outside of the insert 170 and specifically the radial element 172. This enhances the grip between the insert 170 and the surrounding recess, so that any radial expansion of the insert causes bending of the bearing seat 160 either to move the surface to close the gap in the direction of dotted line 192a or to open the gap as the temperature of the insert 170 shrinks and the surface 192 moves toward the line 192b. The effectiveness of the present design has been established as shown for example with the results of the curve of FIG. 8 using a stainless steel bearing seat and aluminum insert which results in a relatively linear gap change of about 0.067 $\mu$m per ° C. with the actual test result shown by the line 222 and the desired, displacement line 220. FIG. 9 shows a graph of the change in power loss with temperature; it illustrates how the power loss is relatively stabilized by the use of the claimed compensation scheme.

Other features and advantages of the present invention will become apparent to a person of skill in the art who studies the present invention disclosure. Therefore, the scope of the present invention is to be limited only by the following claims.

What is claimed is:

1. A fluid bearing comprising an inner bearing element defining a first bearing surface for a gap of said fluid bearing;

a second outer element defining a second surface facing said first surface of said fluid bearing gap;

said second bearing element being formed of a material having a first coefficient of thermal expansion;

and an insert in said second bearing element formed of a material having a second coefficient of thermal expansion different from the coefficient of thermal expansion of said second bearing element;

a layer of viscous fluid in contact with and separating said first surface from said second surface such that said first and second surfaces are capable of relative rotation; and     wherein said expansion element having a second coefficient of expansion greater than the first coefficient of expansion of said bearing seat is such that as temperature increases said second surface bows out toward said first surface such that a thickness of said layer of viscous fluid decreases as temperature increases.

2. A fluid bearing as claimed in claim 1 wherein said second bearing element comprises a bearing seat having an outer portion serving as an outer race of said bearing and an inner portion supporting said second surface of said bearing.

3. A fluid bearing as claimed in claim 2 wherein said insert is located closely adjacent said second surface so that expansion of said insert causes bowing out of said second surface.

4. A fluid bearing as claimed in claim 3 wherein said insert is substantially rectangular.

5. A fluid bearing as claimed in claim 2 wherein said bearing seat extends primarily radially to include said first and second portions.

6. A fluid bearing as claimed in claim 1 wherein said inner element comprises a shaft or sleeve supporting a bearing cone.

7. A fluid bearing as claimed in claim 6 wherein the first bearing surface is flat, or curved, or spherical, or lenticular.

8. A fluid bearing as claimed in claim 7 wherein said second surface is flat, or curved, or spherical, or lenticular.

9. A fluid bearing as claimed in claim 1 wherein said outer bearing element comprises stainless steel, and said insert comprises aluminum.

10. A fluid bearing as claimed in claim 1 wherein the layer of viscous fluid has a viscosity that decreases as temperature increases, said increase in temperature causing said insert to bow said second surface toward said first surface to reduce said gap and thereby diminish changes in stiffness with temperature.

11. A fluid bearing as claimed in claim 10 wherein said insert is ring shaped and includes a thin upward projection offset from a radial centerline, expansion of said insert with an increase in temperature causing outward bowing of said second surface to reduce said gap.

12. A fluid bearing as claimed in claim 11 wherein said outer bearing element comprises stainless steel, and said insert comprises aluminum.

13. A fluid bearing supported motor comprising a shaft having first and second generally conical elements at either end supporting a first surface of a fluid dynamic bearing gap, a bearing seat extending radially from each conical element and defining a second surface cooperating with said first surface to define said bearing gap, each said bearing seat having a first coefficient of expansion, said bearing seats supporting a hub for rotation relative to said shaft and a magnet for cooperating with a stator supported from said shaft for causing rotation of said hub, and an expansion element insert in said bearing seat of a material having a second coefficient of expansion different from the coefficient of expansion of said bearing seat, a layer of viscous fluid in contact with and separating said first surface from said second surface such th at said first and second surfaces are capable of relative rotation; and wherein said expansion element having a second coefficient of expansion greater than the first coefficient of expansion of said bearing seat is such that as temperature increases said second surface bows out toward said first surface such that a thickness of said layer of viscous fluid decreases as temperature increases.

14. A fluid bearing as claimed in claim 13 wherein said insert is located closely adjacent said second surface so that expansion of said insert causes bowing out of said second surface.

15. A fluid bearing as claimed in claim 13 wherein said insert is ring shaped offset from a radial centerline, expansion of said insert with an increase in temperature causing outward bowing of said second surface to reduce said gap.

16. A motor as claimed in claim 15 wherein said insert is disposed in an axial surface of each said bearing seat distal from the stator of said motor.

17. A fluid dynamic bearing comprising an inner bearing element defining a first bearing surface for a gap of said fluid bearing;

a second outer element defining a second surface facing said first surface of said fluid bearing gap;

said second bearing element being formed of a material having a first coefficient of thermal expansion;

and an insert in said second bearing element formed of a material having a second coefficient of thermal expansion different from the coefficient of thermal expansion of said second bearing element;

said insert comprising means for bowing said second surface toward said first surface to reduce said gap with increases in temperature.

* * * * *